United States Patent [19]

Fleming et al.

[11] 4,033,518

[45] July 5, 1977

[54] FORAGE HARVESTER

[75] Inventors: Phillip F. Fleming; Steven J. Campbell, both of West Bend, Wis.

[73] Assignee: Gehl Company, West Bend, Wis.

[22] Filed: May 24, 1976

[21] Appl. No.: 689,594

[52] U.S. Cl. ................................ 241/47; 56/13.9; 180/53 D; 241/101.7; 241/222; 302/37
[51] Int. Cl.² ........................................ B02C 18/22
[58] Field of Search ............ 241/47, 56, 60, 101.7, 241/222; 302/37, 38; 56/13.9; 280/411 C; 180/53 D

[56] References Cited

UNITED STATES PATENTS

| | | | |
|---|---|---|---|
| 2,196,645 | 4/1940 | Saiberlich | 241/222 |
| 3,370,722 | 2/1968 | Fingerut et al. | 302/37 X |
| 3,395,868 | 8/1968 | Dodgen et al. | 241/222 X |
| 3,635,271 | 1/1972 | Markham | 241/101.7 X |
| 3,671,077 | 6/1972 | Hoyt et al. | 302/37 X |
| 3,724,908 | 4/1973 | Burrough et al. | 302/38 X |
| 3,817,464 | 6/1974 | Soysek | 241/222 |
| 3,968,997 | 7/1976 | Mast et al. | 302/38 X |

*Primary Examiner*—Roy Lake
*Assistant Examiner*—Howard N. Goldberg
*Attorney, Agent, or Firm*—James E. Nilles

[57] ABSTRACT

A forage harvester connectable to a vehicle such as a tractor for being towed by the tractor. The forage harvester includes a transmission having a horizontal rotatable input shaft and a horizontal output shaft separated by an angle of 100° such that the input shaft can be positioned at an angle of approximately 10° relative to the direction of motion of the forage harvester and generally co-axial or positioned at a small horizontal angle relative to the rotatable drive shaft extending from the tractor power take-off shaft to the input shaft. The forage harvester also includes a rotatable cutting cylinder and a blower for blowing out forage into a forage wagon towed by the forage harvester, the rotatable cutting cylinder and the blower being laterally spaced apart. The cutting cylinder and the blower are connected by a chute which functions to permit conveyance of the cut crop material to the blower, and a driven rotatable spinner is provided for propelling cut crop material from the cutting cylinder into the chute and toward the blower. The rotatable spinner is comprised of a circular disc, rotatably supported on a rotating drive shaft in closely spaced parallel relationship with respect to the bottom wall of the cut crop receiving housing. The upper surface of the circular disc supports a plurality of generally vertically projecting paddles which rotate with the disc and function as impellers to throw the cut crop material into the chute.

10 Claims, 10 Drawing Figures

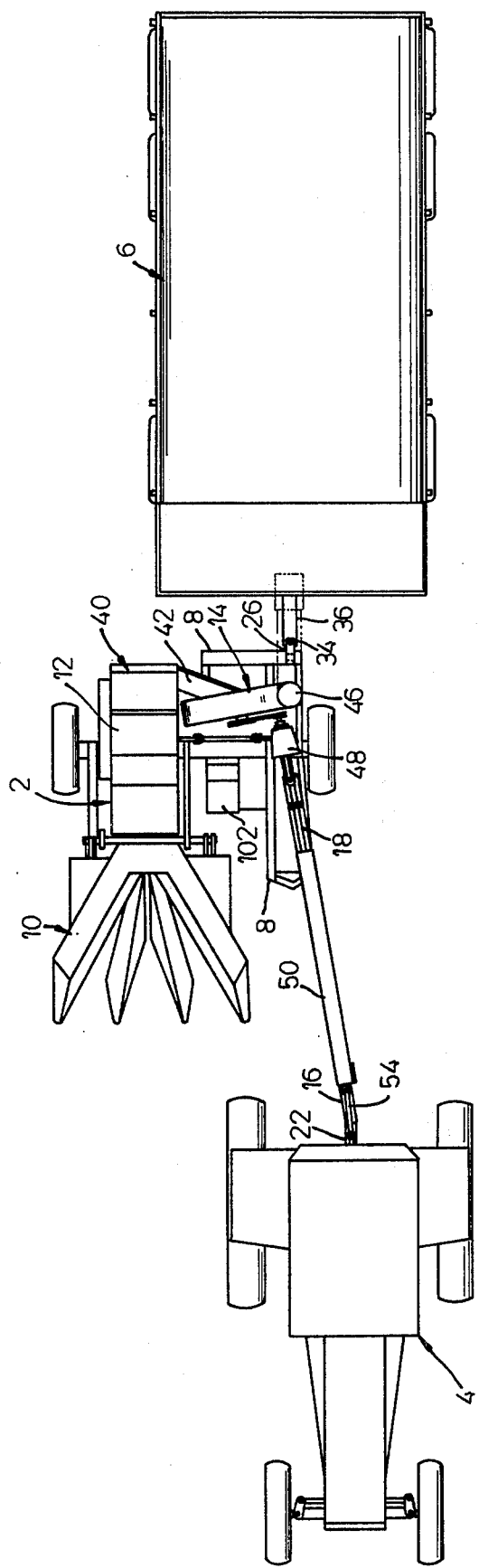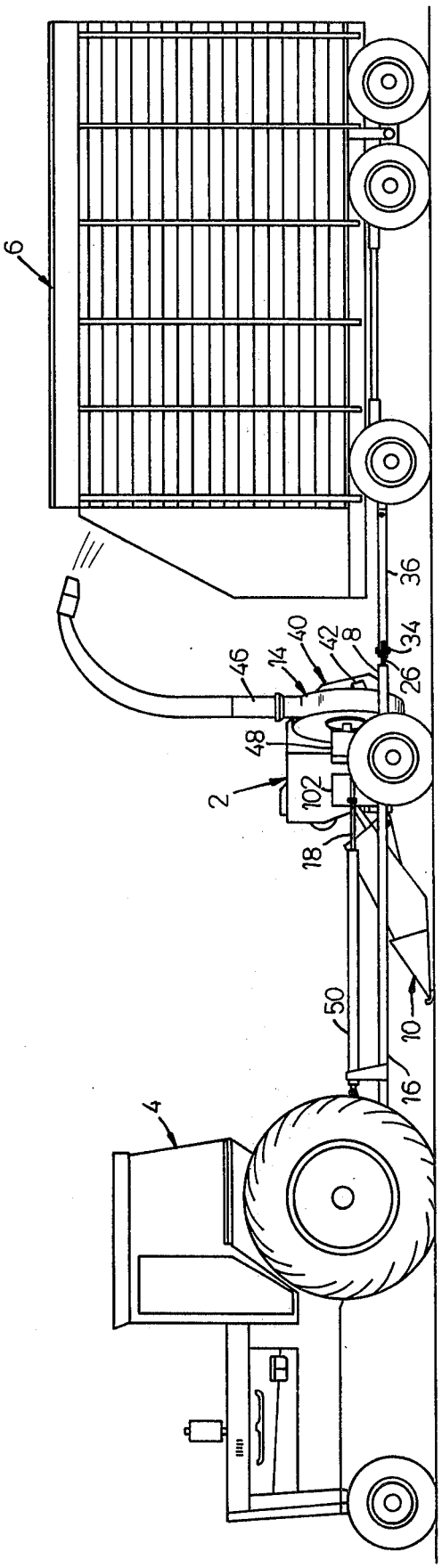
FIG.1
FIG.2

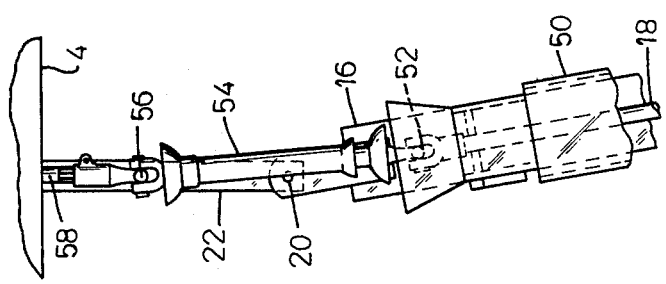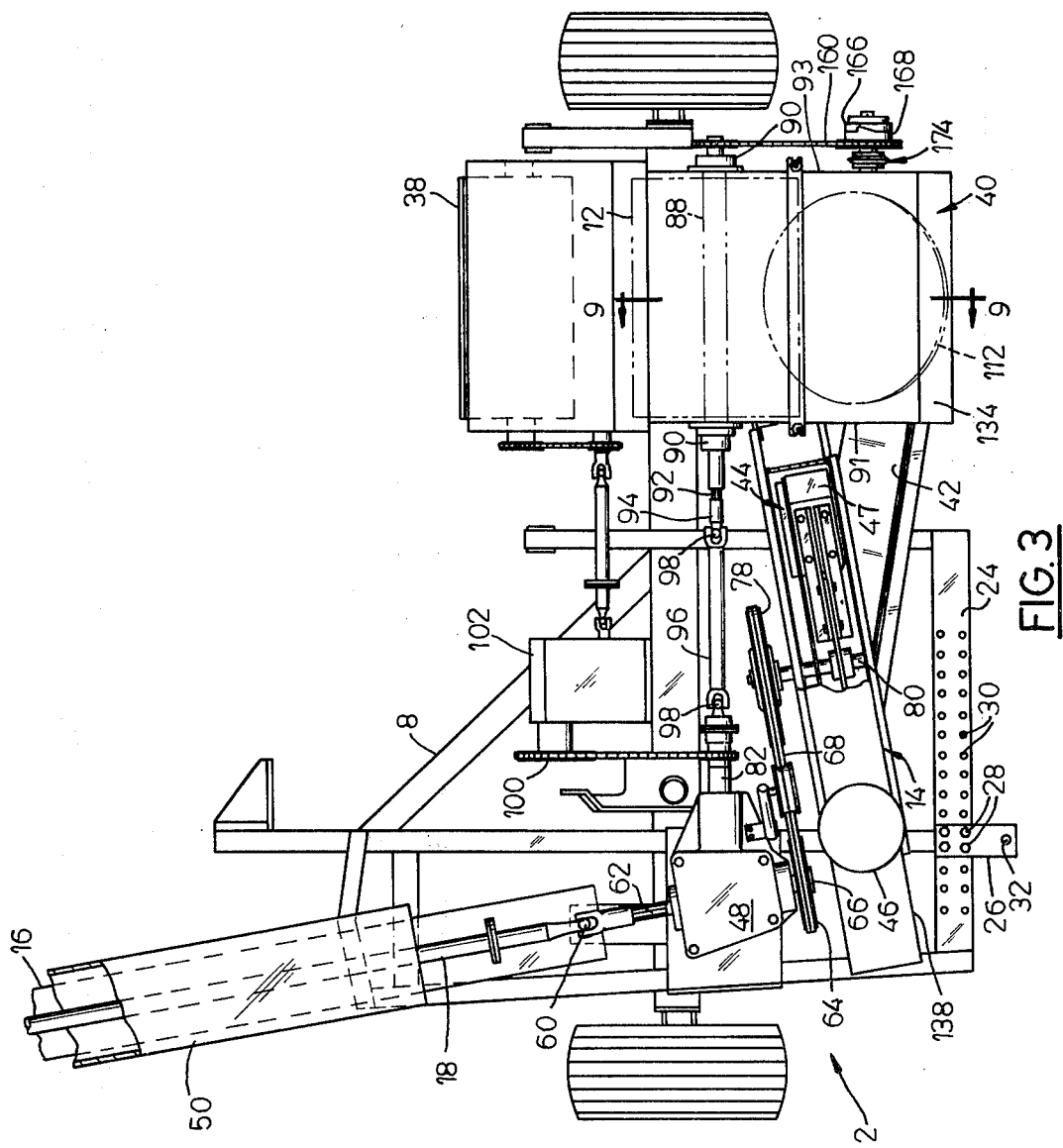

FORAGE HARVESTER

BACKGROUND OF THE INVENTION

The present invention relates to forage harvesters of the type which are pulled by towing vehicles such as tractors and which include a means for chopping cut crop material and for blowing the cut crop material into a forage wagon towed behind the forage harvester.

Forage harvesters of this type generally include a hitch pole for connecting the forage harvester to a tractor and are towed behind the tractor at a position to one side of its center line. The prior art forage harvesters also include a rotatable drive shaft connecting the power take-off shaft of the tractor to an input shaft of a transmission on the forage harvester for driving the various moving parts of the forage harvester such as the cutting cylinder and the blower fan. Since the forage harvester is positioned to one side of the center line of the tractor, the rotatable drive shaft is generally disposed at an angle to the input shaft of the transmission. As a result, universal joints providing a driving connection between the drive shaft and the input shaft are subject to chatter and are subjected to unnecessary wear.

It is desirable that the forage wagon towed by the forage harvester be coupled to the forage harvester at a position generally in alignment with the discharge chute of the forage harvester blower. As a result, in many prior art forage harvesters, the forage wagon is attached to the forage harvester at a position which is laterally spaced, with respect to the direction of motion of the forage harvester when it is being towed, from the point where the hitch pole is attached to the forage harvester. Consequently, the forces applied by the hitch pole upon the forage harvester when it is being towed and the drag on the forage harvester applied by the forage wagon create a moment on the forage harvester tending to cause it to skew with respect to the direction of its movement. The head attachment of the forage harvester is thus misaligned with respect to crop rows, and the efficiency of the forage harvester is substantially affected. The problem of skewing of the forage harvester becomes particularly critical when it is used in muddy conditions wherein the forage wagon places a more substantial drag on the forage harvester.

Forage harvesters which have a blower mounted in a laterally spaced relationship with respect to the chopping cylinder and head attachment of the forage harvester have been found to be advantageous over the prior art forage harvesters because the discharge chute of the blower and the forage wagon can be positioned more directly behind the point of attachment of the hitch pole. This arrangement prevents the weight of the forage wagon from causing skewing of the forage harvester when it is being pulled through a field. However, due to the lateral separation of the blower and the chopping cylinder necessitated by this arrangement, it is necessary to provide a means to convey the cut crop material from the chopping cylinder to the blower. The prior art mechanisms for providing this intermediate conveying means incorporated the use of such devices as screw-type auger systems. These auger systems have not proved completely satisfactory because the cut crop material such as long grasses or wet green crops can cause the augers to be plugged up, and the cut crop material also tends to build up around the circumference of the auger thereby causing a frictional drag on the auger requiring unnecessary amounts of power to drive the auger. Furthermore, the blower fan, which rotates at high speeds, could be used to cause substantial air flow through the auger housing to convey the cut crop material but for the presence of the auger. The use of the augers is thus inefficient because the air flow generated by the blower is not used to its fullest advantage. Finally, due to the structure of the cutting cylinder in the prior art forage harvesters, it has generally been necessary to support the auger behind the cutting cylinder and to force the cut crop material rearwardly toward the auger. With this arrangement, the space below the cutting cylinder tends to become clogged with cut crop material resulting in further inefficient use of the horsepower required to drive the cutting cylinder.

SUMMARY OF THE INVENTION

The present invention comprises a forage harvester which includes both an improved drive system and an improved means for conveying the cut crop material from the cutting cylinder to a blower which is positioned laterally of the cutting cylinder.

The forage harvester of the invention generally includes a frame which supports a rotatable cutting cylinder and a blower in laterally spaced relationship. Crop material is fed into the cutting cylinder by a harvesting attachment such as a hay head attachment or a corn head attachment and the crop material is chopped by the rotating blades of the cutting cylinder. A spinner housing for receiving the cut crop material from the cutting cylinder is positioned generally rearwardly of the cutting cylinder and communicates with a blower which includes a large fan comprised of a plurality of rotating paddles which blow the cut crop material through a discharge chute into the forage wagon. The cutting cylinder is supported for rotation about a horizontal axis and is positioned such that this horizontal axis is generally perpendicular to the direction of motion of the forage harvester.

The forage harvester also includes a hitch pole for attaching it to a tractor or the like and a rotatable drive shaft extending between the power take-off shaft of the tractor and the input shaft of the forage harvester transmission. The forage harvester is intended to be towed behind the tractor in such a position that the hitch pole and the rotatable drive shaft are at an angle of approximately 10° with respect to the direction of motion of the forage harvester. The blower is positioned such that the blower fan is rotatable about a horizontal axis positioned at a 10° angle relative to the direction of motion of the forage harvester, and thus substantially parallel to the rotatable drive shaft. The forage harvester transmission includes an input shaft which is intended to be aligned substantially co-axially or at a small horizontal angle with the rotatable drive shaft and parallel to the axis of the blower fan and which is coupled by means of a universal joint to the rotatable drive shaft. The input shaft is connected by means of gears to an output shaft for driving the rotatable cutting cylinder. The output shaft is co-axial with the axis of the cutting cylinder and is oriented at 100° relative to the input shaft, the axis of the blower fan, and the rotatable drive shaft.

An advantage of the present invention is that the alignment of the axis of the blower fan at an angle of 10° with respect to the direction of motion of the forage harvester and the relative orientation of the transmission input and output shafts at 100° permits the rotatable drive shaft and the input shaft to operate in substantially co-axial alignment or at a small relative horizontal angle. This substantially reduces the wear on the universal joint connecting the drive shaft and the input shaft and prevents chatter of the universal joint by eliminating joint induced accelerations.

The forage harvester of the present invention also includes an improved means for conveying the cut crop material from the cutting cylinder to the blower. A rotatable spinner is positioned in the spinner housing, which is adjacent the cutting cylinder, and in generally parallel spaced relationship adjacent the bottom wall of the housing in order to receive the material from the cutting cylinder and for propelling it into the chute where the air flow generated by the blower provides the motive force for moving the cut crop material into the blower. The spinner comprises a thin flat circular disc positioned generally rearwardly and below the cutting cylinder and having a portion which extends beneath the cutting cylinder. A plurality of generally radially extending paddels are secured to both the upper and lower surfaces of the circular disc such that the spinner can function as an impeller to force the cut crop material into the chute. Air holes are provided in the bottom wall of the housing adjacent the axis of the rotatable spinner to permit air flow through the bottom wall. The paddles secured to the lower surface of the spinner function to generate a substantial air flow adjacent the bottom wall and across the floor of the connecting chute to provide a scouring action of the bottom wall of the housing and the floor of the chute thereby preventing build-up of cut crop material.

An advantage of the present invention is that the chute connecting the housing and the blower is unobstructed and properly positioned such that the substantial air flow generated by the blower can be used to convey the cut crop material into the blower and thereby provides a more efficient use of the power input into the blower. Furthermore, since the chute is unobstructed, it does not tend to become plugged or the like.

The spinner can be positioned with at least a portion of its periphery beneath the chopping cylinder and the concave screen and can thereby function to clear out material from under the cylinder. This prevents the build-up of cut crop material beneath the cutting cylinder and facilitates use of a greater portion of the concave screen as a cutting surface and does not require all of the cut crop material to be carried with the cutting cylinder until it can be ejected rearwardly.

Unlike an auger, the spinner is intended only to convey the cut crop material from the cylinder to the chute wherein the air flow through the chute provides the means for further conveyance of the cut crop material. Therefore, less power is required to drive the spinner than is required to drive an auger or the like. Furthermore, the spinner is not subjected to drag as in the case of an auger wherein material becomes wedged between the peripheral edges of the auger flutes and the inside surface of the auger housing.

These advantages and additional advantages of the invention will be more clearly set forth in the following description of a preferred embodiment of the invention.

BRIEF DESCRIPTION OF THE DRAWINGS

FIG. 1 is a plan view of a forage harvester of the invention connected to a tractor and towing a forage wagon;

FIG. 2 is a side view of the apparatus shown in FIG. 1;

FIG. 3 is an enlarged partial plan view of the forage harvester shown in FIG. 1 with portions cut away in the interest of clarity;

FIG. 4 is an enlarged partial plan view of the hitch pole and drive shaft of the forage harvester shown in FIG. 1 and attached to the tractor;

DESCRIPTION OF A PREFERRED EMBODIMENT

Figure 5:
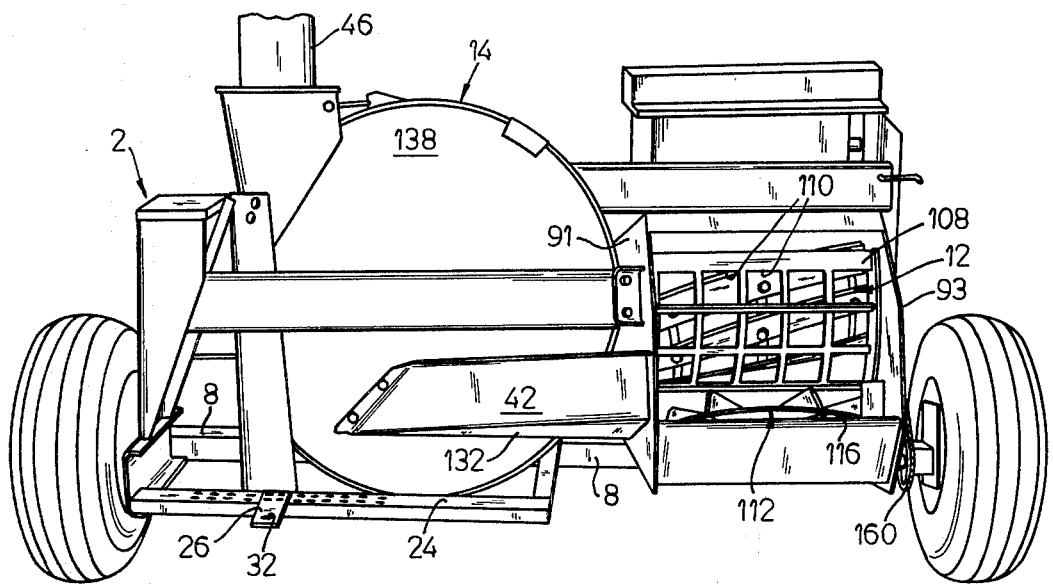
FIG. 5 is an enlarged perspective view of the rear of the forage harvester shown in FIGS. 1 and 2 with the spinner housing cover removed.

The forage harvester 2 of the present invention is shown in FIGS. 1 and 2 as being hitched to a towing vehicle comprising a tractor 4 and as pulling a forage wagon 6. The forage harvester 2 is generally comprised of a frame 8 which functions to support a head attachment 10, shown for purposes of example as a corn head attachment. The frame 8 also supports a rotating cutting cylinder 12 (FIG. 5) which is provided to chop crop material into a fine particulate form and a blower 14 which is intended to blow the particulate cut crop material into the forage wagon 6.

The forage wagon 6 is connected to the tractor 4 by a rigid hitch pole 16 and by a rotatable drive shaft 18. The rigid hitch pole 16 is pivotably connected by a pin 20 (FIG. 4) at its forward end to the tow bar 22 of the tractor 4 and is pivotably connected at its rearward end to the forage harvester frame 8.

The frame 8 of the forage harvester 2 includes a laterally extending channel 24 at the rearward portion of the frame for supporting a shiftable forage wagon hitch plate 26 which can be secured to the channel 24 by four bolts 28 which can be received within four of the bores 30 which extend along the length of the channel 24. The forage wagon hitch plate 26 includes a vertical bore 32 for receiving a hitch pin 34 (FIG. 2) functioning to pivotably attach the tongue 36 of the forage wagon 6 to the forage harvester 2. The position of the hitch plate 26 can be varied along the length of the channel 24 to vary the relative positions of the forage wagon with respect to the forage harvester as desired.

During the operation of the forage harvester 2, the corn head attachment 10 is intended to function to feed crop material into the feed roller 38 (FIG. 3) whereby the crop material can then be fed into the rotating cutting cylinder 12 where it is cut into particulate cut crop material. The cut crop material is then propelled by the rotating cutting cylinder 12 into a spinner housing 40, adjacent to and rearward of the rotating cutting cylinder 12, and is then conveyed through a chute 42 into the blower 14. The blower 14 houses a large rotating paddle wheel or fan 44 rotatable about a horizontal axis and including a plurality of circumferentially spaced paddles 47 and functional to force the cut crop material tangentially through a discharge chute 46 and into the forage wagon 6.

The cutting cylinder 12, the various moving parts of the corn head attachment 10, and the blower 14 are operably connected, by means of a transmission 48, to the rotatable drive shaft 18 (FIGS. 1 and 3). The rotatable drive shaft 18 is surrounded by an elongated drive shaft guard 50 and is connected at its forward end by means of a universal joint 52 (FIG. 4) to a splined telescoping drive shaft assembly 54. The telescoping drive shaft assembly 54 is in turn connected by means of a universal joint 56 to the splined end of the rotatable power take-off shaft 58 of the tractor 4. The drive shaft 18 is connected at its rearward end by means of a universal joint 60 and in generally co-linear relationship when viewed in plan or at a small horizontal angle relative to the splined end of the power input shaft 62 of the transmission 48. The power input shaft 62 extends completely through the transmission 48 and provides a direct drive for a blower drive sheave 64 secured to the opposite end 66 of the input shaft 62. The blower drive sheave 64 supports a blower drive belt 68 which is received around a fan drive sheave 78 in turn operably secured to a projecting end of the fan drive shaft 80. The transmission 48 also includes a laterally extending power output shaft 82 operably connected to the power input shaft 62 by gears within the transmission 48. The power output shaft 82 is disposed at an angle of 100° relative to the power input shaft 62 and extends laterally across the frame 8 perpendicular to the direction of motion of the forage harvester when it is being towed by the tractor 4.

Figure 9:
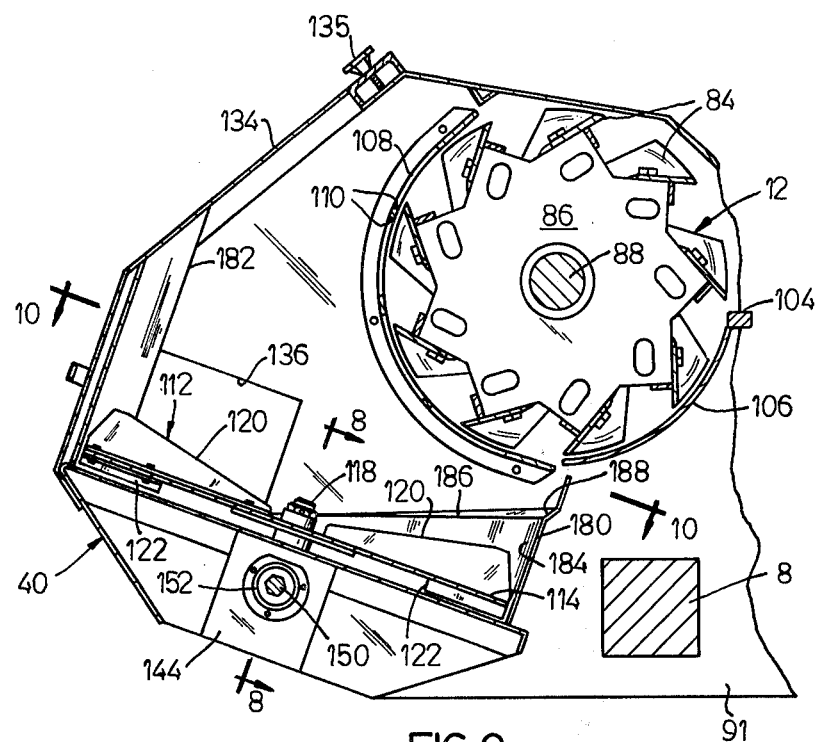
FIG. 9 is an enlarged cross-sectional view taken generally along the line 9—9 in FIG. 3.

The cutting cylinder 12 is comprised of a plurality of cutting knives or blades 84 supported in circumferential relationship by a plurality of supporting plates 86 in turn supported in perpendicular relationship on a cylinder drive shaft 88 (FIG. 9). The cutting cylinder shaft 88 is supported at its opposite ends by bearings 90 (FIG. 3) and includes a splined end 92 received in splined relationship in a socket 94 of a drive linkage 96. The bearings 90 are supported by opposed, parallel, vertical side plates 91 and 93 in turn supported by the frame 8. The drive linkage 96 includes universal joints 98 at its opposite ends and is connected at its end opposite the cutting cylinder shaft 88 to the output shaft 82 of the transmission. The output shaft 82, the drive linkage 96, and the cutting cylinder shaft 88 are co-axial and aligned at an angle of 100° with respect to the drive shaft 18 and with respect to the axis of rotation of the blower fan 44. The output shaft 82 of the transmission 48 also drive the feed rollers 38 by means of a chain drive assembly 100 and a transmission 102.

As best shown in FIG. 1, during its operation, the forage harvester is disposed laterally to the side of the tractor so that the corn head 10 is disposed to one side of the tractor. The hitch pole 16 and the drive shaft 18 are connected to the forage harvester and to the tractor such that they define an angle of approximately 10° with respect to the direction of movement of the tractor and the forage harvester. By providing a transmission 48 having an input shaft 62 and output shaft 82 oriented at 100°, it is possible to connect the drive shaft 18 and the input shaft 62 in substantially co-axial arrangement or with a small horizontal angle therebetween thereby eliminating joint induced angular acceleration and eliminating chatter in the U-joint 60 connecting them. By supporting the blower 14 such that the axis of its fan is parallel to the axis of the input shaft 62, it is also possible to attach the blower drive sheave 64 directly to a projecting end of the input shaft 62. Furthermore, by spacing the blower 14 laterally of cutting cylinder 12, the forage wagon 6 can be positioned at a point generally directly behind the point where the drive shaft 18 and hitch pole 16 are attached to the forage wagon. This relative arrangement avoids skewing of the forage harvester.

The relative position of the forage harvester with respect to the tractor, and the relative angle of the drive shaft and hitch pole may vary in some instances depending upon the type of head attachment used, the crop row widths, and the width of the head attachment used. However, the angle of the hitch pole and the drive shaft with respect to the direction of movement will generally be within the range of 5°–16° and will in most instances be approximately 10°.

When crop material is fed from the feed rollers 38 toward the cutting cylinder 12, the crop material is chopped between the shear bar 104 adjacent a concave plate 106 and the sharpened edge of the cutting cylinder knives 84. A concave screen 108 is secured adjacent to the rearward portion of the cutting cylinder and includes a plurality of rectangular holes 110 through which the cut crop material may pass into the spinner housing 40. The cutting cylinder knives 84 also function in combination with the concave screen 108 to further cut the crop material.

Figure 6:
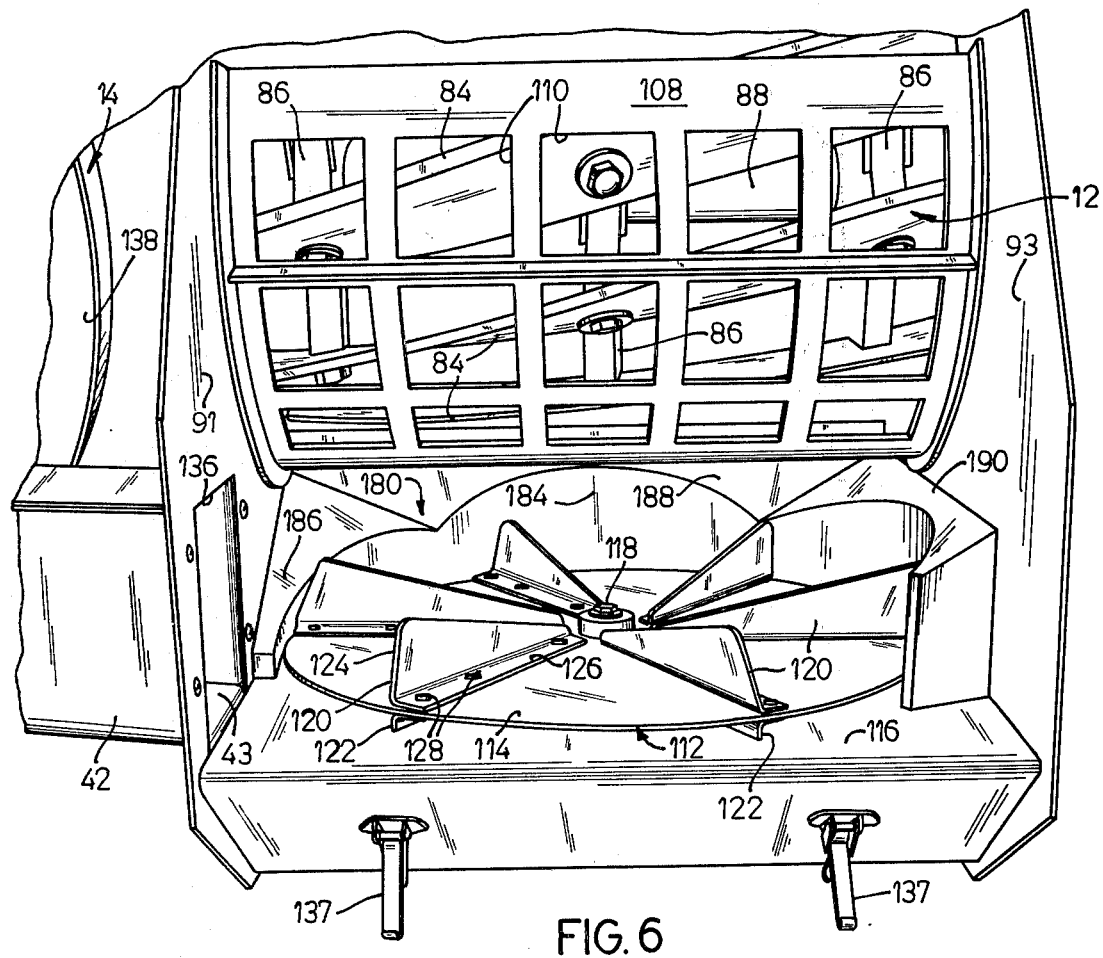
FIG. 6 is an enlarged perspective view of the spinner housing and rotatable spinner of the forage harvester shown in FIG. 5.
Figure 7:
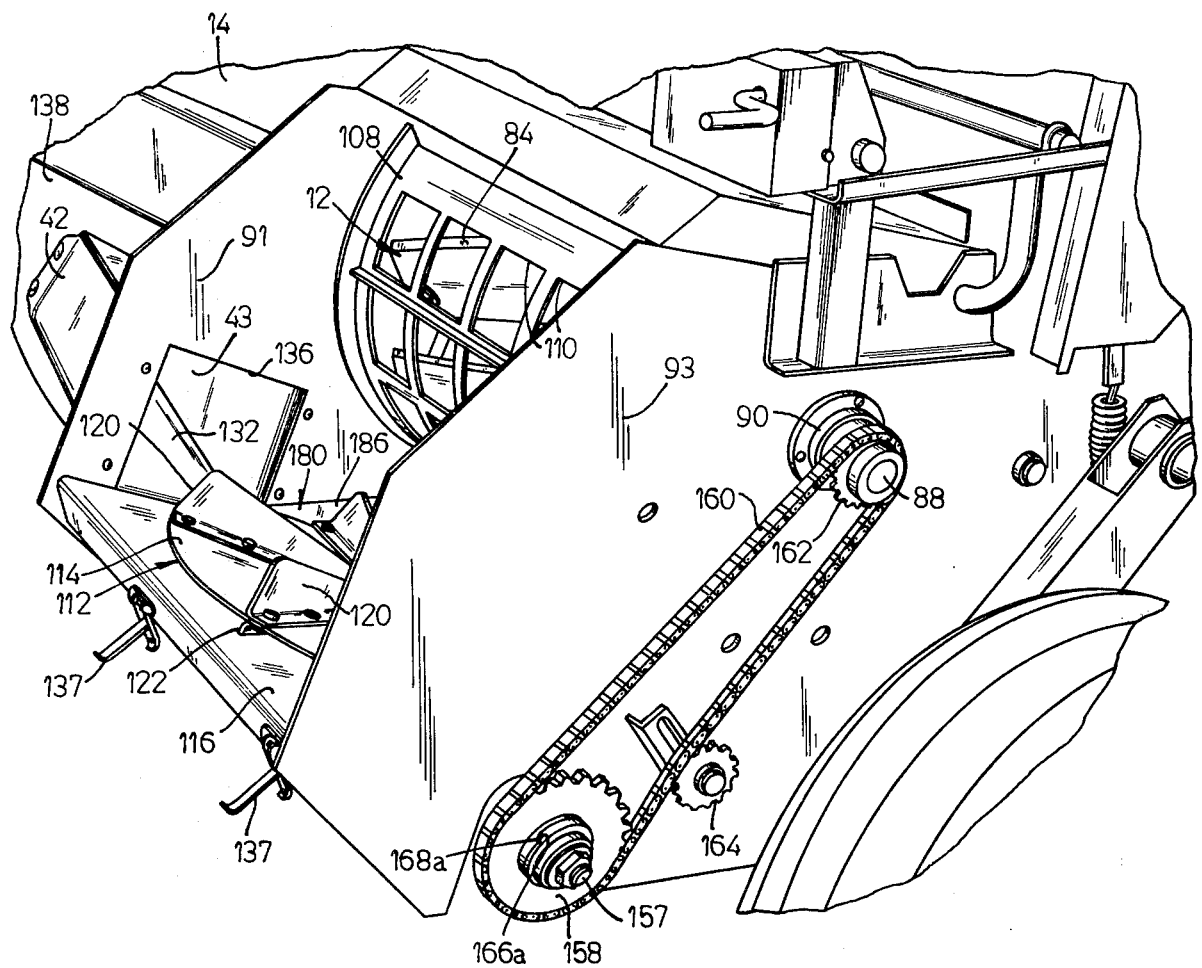
FIG. 7 is an enlarged perspective view of the spinner housing of the forage harvester shown in FIG. 5.
Figure 10:
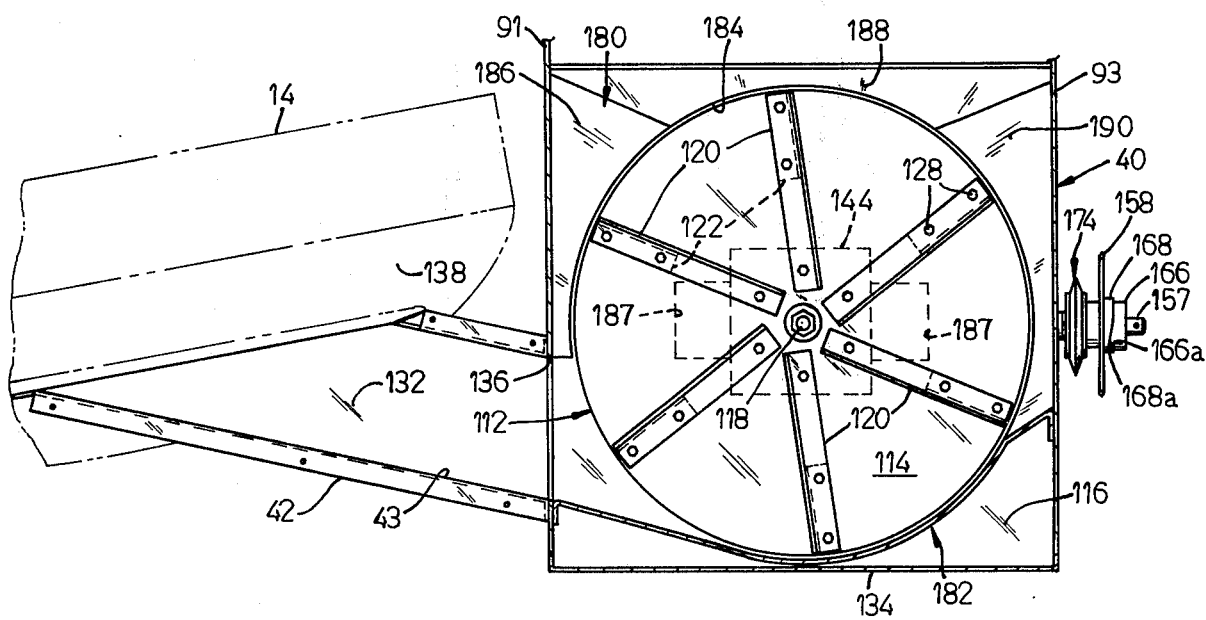
FIG. 10 is a cross-sectional view taken along the line 10—10 in FIG. 9.

Since the cutting cylinder 12 and the blower 14 are disposed in a laterally spaced relationship, an intermediate means for propelling the cut crop material from the cutting cylinder to the blower is necessary. This intermediate conveying means is provided by a rotatable spinner 112 shown in FIGS. 5–10. The rotatable spinner 112 functions to receive the cut crop material from the cutting cylinder and to propel it into a chute 42 whereby it can be conveyed to the blower. The rotatable spinner 112 is comprised of a flat circular disc 114 positioned parallel to and in spaced relationship with respect to the inclined bottom wall 116 of the spinner housing. The circular disc is supported by a hexagonal drive shaft 118 for rotation about an axis which is inclined from the vertical (see FIG. 9). The circular disc 114 rigidly supports a plurality of paddles 120 which are rigidly secured to its upper surface and arranged in a radially outwardly extending pattern around the disc. The spinner paddles 120 are each positioned at a slight angle with respect to a radial line as best shown in FIG. 10 to increase the radially outward force on the cut crop material as the spinner 112 rotates. The disc also supports a plurality of short paddles or scrappers 122 which are secured in radially extending relationship to the lower surface of the circular disc 114 and adjacent its periphery directly beneath the paddles 120. The paddles 120 each include an elongated generally triangularly shaped blade portion 124 extending upwardly from the surface of the circular disc 114 and a base portion 126 parallel to the surface of the circular disc 114. The paddles 120 are each bolted to the circular disc by a plurality of bolts 128. The blade portions 124 of the paddles 120 are generally planar and are slightly inclined from the perpendicular with respect to the surface of the circular disc 114 and in the direction of rotation of the spinner. The scrapers 122 extend perpendicularly from the lower surface of the circular disc 114 so that they are closely adjacent to the bottom wall 116 of the spinner housing 40, and they are also bolted to the circular disc by the bolts 128. The spinner housing 40 is comprised of a pair of the parallel rearwardly extending portions of the opposed side walls 91 and 93, the bottom wall 116 and a removeable cover 134, best shown in FIG. 9. During operation, the removeable cover is secured in place by a hand operable nut 135 and by a pair of latch members 137. In the interest of clarity, FIGS. 5-7 show the cover 134 removed.

The chute 42 is a generally rectangular structure having a rectangular passageway 43 therein and received adjacent an opening 136 in the side wall 91 of the spinner housing whereby the passageway 43 and the chamber defined by the housing are placed in communication. The chute 42 is positioned such that its floor 132 is coplanar with the bottom wall 116 of the spinner housing 40. The opposite end of the chute 42 is received in angular relation against an opening in the circular vertical rear wall 138 of the blower 14. As shown in FIG. 5, the chute 42 is connected to the blower 14 at a position which is adjacent to the axis of the blower fan 44. Since rotation of the fan 44 within the blower generates a low pressure area adjacent the axis of the fan 44, connecting the chute to the blower adjacent the fan axis will cause air to be drawn through the chute 42 from the spinner housing 40. This air flow through the chute 42, abetted by the velocity imparted to the crop by the spinner 112, is sufficient to convey the cut crop material within the housing to the blower so that it can be discharged into the forage wagon. The positioning of the chute 42 relative to the vertical rear wall 138 of the blower 14 also functions to guide the cut crop material into the blower in the same general direction in which the paddles 47 are moving to thereby create a smooth flow of material into the blower 14.

The rotatable spinner 112 is secured to the upper end of the hexagonal drive shaft 118 (FIG. 8) for rotation with the drive shaft. The drive shaft 118 is in turn rotatably supported at its upper end by a bearing assembly 140 and at its lower end by a similar bearing assembly 142. The bearing assembly 140 is supported by the bottom wall 116 of the spinner housing, and the bearing assembly 142 is supported within the closed gear box 144 which surrounds the lower end of the drive shaft 118. A bevel gear 146 is positioned around the lower end of the drive shaft 118 and is drivingly engaged by a second bevel gear 148 secured to the end of a perpendicularly extending horizontal drive shaft 150. The horizontal drive shaft 150 is rotatably supported at its end adjacent to the drive shaft 118 by a bearing assembly 152 journalled in the side wall 154 in the gear box 144. The other end of the horizontal drive shaft 150 is supported by a bearing assembly 154 secured within an opening 156 in the spinner housing side wall 132. The horizontal drive shaft 150 is also hexagonal and includes an outwardly projecting end 157 driven by a chain sprocket 158. A chain 160 (FIG. 7) is received around the sprocket 158 and around a drive sprocket 162 secured to a projecting end of the cylinder shaft 88. Thus, the cylinder shaft 88 drives the chain sprocket 162 and in turn drives the horizontal drive shaft 150. A tightener sprocket 164 is also provided to maintain the appropriate tension on the drive chain 160.

Figure 8:
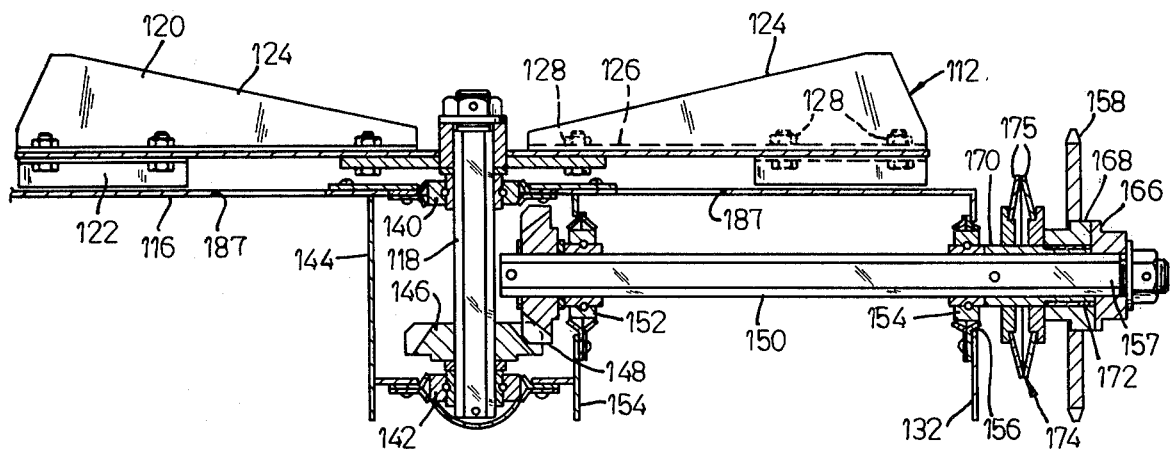
FIG. 8 is an enlarged cross section of the rotatable spinner taken along the line 8—8 in FIG. 9.

In order to prevent damage to the rotatable spinner or its related parts in the event that the spinner is stopped by some obstruction or wedging of the cut crop material, a slip clutch is disposed between the chain driven sprocket 158 and the horizontal drive shaft 150 to permit the sprocket 158 to turn freely with respect to the drive shaft (see FIG. 8). A driven clutch member 166 having a hexagonal bore is received around the end 157 of the drive shaft 150 and functions to drive the drive shaft 150. The chain driven sprocket 158 is secured by means of welding or the like to a drive clutch member 168. The drive clutch member 168 is supported by a bushing 172 and a sleeve 170 on the end 157 of the drive shaft 150 for rotation with respect to the drive shaft. The sleeve 170 includes a hexagonal inner bore and a circular outer configuration. The bushing 172 is rotatable around the circumference of the sleeve 170 and is disposed between the clutch member 168 and the sleeve 170. The drive clutch member 168 and the driven clutch member 166 include rounded engaging surfaces 166a and 168a, best shown in FIG. 7, and are biased into mutual engagement by a compression spring assembly 174 comprised of a pair of opposed belleville washers 175. In the event that an obstruction prevents continued rotation of the rotatable spinner 112, the rounded engaging surfaces 166a and 168a of the drive clutch member will permit relative rotation of the two clutch members 166 and 168. In ordinary operation, however, the compression caused by the belleville washer assembly 174 will prevent such disengagement of the clutch members 166 and 168.

During the forage cutting process, cut crop material will be forced through the concave screen 108 by the cutting cylinder 12 and into the spinner housing 40. The rotating spinner 112 includes a portion which is positioned beneath the concave screen 108 and the cutting cylinder 12. The rotation of the spinner and the movement of the paddles 120 will cause the cut crop material to be impelled toward the opening 136 and into the chute 42. Air flow through the chute 42 is sufficient in combination with the action of the spinner to convey the cut crop material to the blower 14. In order to prevent accumulation of the cut crop material within the housing 40, the interior surface of the housing, and the inside surface of the removable cover 134 include shrouds 180 and 182, respectively. As shown in FIG. 10, the shrouds define a generally cylindrical surface 184 around the spinner and provide tapered surfaces 186, 188, and 190 converging toward the spinner 112 such that the cut crop material is conveyed toward the spinner and is not allowed to accumulate in corners or the like within the housing.

The bottom wall 116 of the housing is provided with a pair of generally rectangular holes 187 (FIGS. 8 and 10) adjacent to the axis of the spinner 112 to permit air flow through the bottom wall 116 into the housing 40. The air holes 187 are disposed radially inwardly with respect to the scrapers 122. Rotation of the spinner 112 causes the scrapers 122 to function as impellers thereby causing an air flow upwardly through the holes 187 and through the opening 136 into the chute 42. The rotatable spinner 112 thus also functions to generate air flow through the chute to convey the cut crop material into the blower 14. The scrapers 122 tend to generate air flow along the bottom wall 116 of the housing and along the floor 132 of the chute 42. This air flow tends to have a scouring action preventing build-up of cut crop material on the bottom wall 116 and on the floor 132 of the chute 42.

RESUME

The forage harvester of the present invention thus includes a drive system wherein the drive shaft extending from the tractor to the forage harvester can be substantially co-axial with the input shaft of the forage harvester transmission. This prevents undue wear on the U-joint connecting the end of the drive shaft to the transmission input shaft eliminating the joint induced angular accelerations and eliminating chatter in the U-joint. The forage harvester also includes a blower which is positioned in laterally spaced relationship with respect to the head attachment and the cutting cylinder such that the forage wagon can be towed in a position wherein the forage wagon and the hitch pole cause less of a moment to be applied to the forage harvester. The forage harvester also includes an improved, more efficient, and more trouble-free means for conveying the cut crop material laterally from the cutting cylinder into the blower.

We claim:

1. A forage harvester for use with a towing vehicle and connectable to a said towing vehicle for movement therewith, the forage harvester including:
   a frame;
   means for attaching the frame to a said towing vehicle whereby the forage harvester can be towed;
   a transmission supported by the frame and including an input shaft, the input shaft being rotatable about an axis disposed at an acute angle with respect to the direction of movement of the forage harvester when viewed in plan;
   a rotatable drive shaft having opposite ends, one of said opposite ends connectable to said towing vehicle and the other of the opposite ends connected to the input shaft of the transmission, the input shaft and the drive shaft being substantially co-linear when viewed in plan;
   a blower supported by the frame and including a fan rotatable around a horizontal axis substantially parallel to the axis of the input shaft and the rotatable drive shaft; and
   means for operably connecting the fan and the input shaft for rotating the fan.

2. The forage harvester set forth in claim 1 further including a cutting cylinder supported by the frame, the blower and the cutting cylinder being transversely spaced apart relative to the direction of movement of the forage harvester.

3. The forage harvester set forth in claim 2 further including a housing supported by the frame and adjacent to and rearwardly of the cutting cylinder, the housing being transversely spaced apart from the blower with respect to the direction of movement of the forage harvester and the housing defining a chamber for receiving cut crop material from the cutting cylinder, and a chute between the housing and the blower for conveying cut crop material from the housing to the blower, the blower including a substantially vertical wall and the chute having one end connected to the vertical wall, and the chute being positioned at an acute angle with respect to the vertical wall.

4. The forage harvester set forth in claim 3 further including a rotatable spinner rotatably supported within the housing and for moving cut crop material toward the chute, the rotatable spinner comprising a circular disc and a plurality of radially extending paddles secured to the disc.

5. A forage harvester for being moved over a crop to be harvested and comprising: a crop cutting cylinder rotatable about a transverse axis in respect to the direction of harvester movement, said cylinder having a generally rearward discharge side, a spinner rotatably supported about a generally vertical axis and located generally below and in overlapping relationship in a longitudinal direction and adjacent said discharge side and having a completely exposed top extending across the length of said cylinder for receiving said cut crop material from said cylinder, a housing surrounding said spinner and for discharging cut crop material from said spinner in a generally tangential direction and at one lateral side of said housing, a crop blower rotatable about a generally horizontal axis which axis is generally perpendicular to said cutting cylinder transverse axis, said blower located completely laterally to said one side of said housing, said cylinder and said spinner and adjacent the latter for discharging cut crop material directly thereto, said blower having a generally rearward side, a chute connected between said housing and said blower side and for receiving cut crop material from said spinner and directing it into said blower through said side thereof.

6. The harvester set forth in claim 5 further characterized in that said blower includes a fan mounted about a generally horizontal axis, said fan including circumferentially spaced paddles rotatable about said axis, said blower also including a housing enclosing said fan whereby said blower and fan act to create a suction in said chute to thereby assist in drawing cut material from said chute into said blower and discharging it tangentially from said blower.

7. The harvester set forth in claim 6 wherein said chute acts to guide said material into said blower housing in the same general direction in which said paddles are moving to thereby create a smooth flow of material into said blower for conveyance by said paddles.

8. A forage harvester adapted to be towed over a crop to be harvested and including a frame, a transmission supported by the frame and including an input shaft, the input shaft being rotatable about an axis disposed at an acute angle with respect to the direction of movement of the forage harvester when viewed in plan, a rotatable drive shaft having opposite ends, one of said opposite ends connectable to a towing vehicle and the other of the opposite ends connected to the input shaft of the transmission, the input shaft and the drive shaft being substantially co-linear when viewed in plan, a crop cutting cylinder supported by the frame and having a rotatable horizontal axis disposed transversely in respect to the direction of vehicle movement, said cutting cylinder having a rear discharged side, a crop spinner mounted about a generally vertical axis and located generally to the rear and beneath said cylinder for receiving cut crop material therefrom, a housing surrounding said spinner and for discharging cut crop material from said spinner in a generally tangential direction and at one lateral side of said housing, a blower supported by the frame and including a fan rotatable around a horizontal axis substantially parallel to the axis of the input shaft and the rotatable drive shaft, the blower having two flat and generally parallel vertical sides, said sides extending laterally in respect to the direction of harvester travel and defining vertical planes disposed at an acute angle with respect to the axis of said cutting cylinder when viewed in plan, said blower being located adjacent said spinner and at said one side of said spinner housing, and a crop conveying chute supported between said spinner discharge side and one of said sides of said blower for conveying material discharged by said spinner and into said blower, said chute being positioned at an acute angle with respect to said one of said sides of said blower.

9. The forage harvester set forth in claim 8 wherein the spinner includes a rotatably supported circular disc and a plurality of paddles secured to the disc and wherein a portion of the spinner is received beneath the cutting cylinder whereby cut crop material from said cylinder is received on the spinner and is impelled toward the blower.

10. The forage harvester set forth in claim 9 wherein the housing includes a bottom wall and the spinner is rotatably supported for rotation around an axis inclined to the vertical and is supported in spaced parallel adjacent relationship to the bottom wall and wherein the circular disc includes an upper surface and a lower surface, both of said surfaces supportinng paddles.

* * * * *